(12) United States Patent
Furuyama

(10) Patent No.: US 11,041,606 B1
(45) Date of Patent: Jun. 22, 2021

(54) WAVELENGTH CONVERSION MEMBER AND METHOD FOR MANUFACTURING SAME, AND LIGHT-EMITTING DEVICE

(71) Applicant: NIPPON ELECTRIC GLASS CO., LTD., Otsu (JP)

(72) Inventor: Tadahito Furuyama, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 16/763,327

(22) PCT Filed: Nov. 29, 2018

(86) PCT No.: PCT/JP2018/044047
§ 371 (c)(1),
(2) Date: May 12, 2020

(87) PCT Pub. No.: WO2019/116916
PCT Pub. Date: Jun. 20, 2019

(30) Foreign Application Priority Data

Dec. 12, 2017 (JP) .............................. JP2017-237557
Sep. 18, 2018 (JP) .............................. JP2018-173558

(51) Int. Cl.
*F21V 9/32* (2018.01)
*C09K 5/14* (2006.01)
(Continued)

(52) U.S. Cl.
CPC .................. *F21V 9/32* (2018.02); *C09K 5/14* (2013.01); *C09K 11/02* (2013.01);
(Continued)

(58) Field of Classification Search
CPC .. F21V 9/32; C09K 5/14; C09K 11/02; C09K 11/0883; C09K 11/646; C09K 11/7706
(Continued)

(56) References Cited

U.S. PATENT DOCUMENTS 5,998,925 A 12/1999 Shimizu et al.
6,069,440 A 5/2000 Shimizu et al.
(Continued)

FOREIGN PATENT DOCUMENTS

JP 2000-208815 A 7/2000
JP 2003-243727 A 8/2003
(Continued)

OTHER PUBLICATIONS

Official Communication issued in International Patent Application No. PCT/JP2018/044047, dated Feb. 26, 2019.

*Primary Examiner* — Christopher M Raabe
(74) *Attorney, Agent, or Firm* — Keating and Bennett, LLP

(57) ABSTRACT

Provided are: a wavelength conversion member capable of reducing the decrease in luminescence intensity with time and the melting of component materials when irradiated with high-power excitation light; a method for manufacturing the same; and a light-emitting device using the wavelength conversion member. A wavelength conversion member 10 is made of a phosphor powder 2 and a thermally conductive filler 3 both dispersed into an inorganic binder 1, a refractive index difference between the inorganic binder 1 and the thermally conductive filler 3 being 0.2 or less, a volume ratio of a content of the inorganic binder 1 to a content of the thermally conductive filler 3 being 40:60 to 5:95.

17 Claims, 1 Drawing Sheet

(51) Int. Cl.
  *C09K 11/02* (2006.01)
  *C09K 11/64* (2006.01)
  *C09K 11/08* (2006.01)
  *C09K 11/77* (2006.01)
  *F21Y 115/30* (2016.01)

(52) U.S. Cl.
  CPC ........ *C09K 11/0883* (2013.01); *C09K 11/646* (2013.01); *C09K 11/7706* (2013.01); *F21Y 2115/30* (2016.08)

(58) Field of Classification Search
  USPC .......................................................... 362/84
  See application file for complete search history.

(56) References Cited

U.S. PATENT DOCUMENTS

| | | | | |
|---|---|---|---|---|
| 7,391,046 B2 * | 6/2008 | Tsutsumi | ............... | H05B 33/20 257/13 |
| 2013/0258637 A1 * | 10/2013 | Wang | ................... | H01L 33/505 362/84 |
| 2016/0233389 A1 | 8/2016 | Furuyama et al. | | |

FOREIGN PATENT DOCUMENTS

| | | | |
|---|---|---|---|
| JP | 2003-258308 | A | 9/2003 |
| JP | 2007-157798 | A | 6/2007 |
| JP | 4895541 | B2 | 3/2012 |
| JP | 2016-149389 | A | 8/2016 |
| JP | 2016-225581 | A | 12/2016 |

* cited by examiner

[FIG. 1]
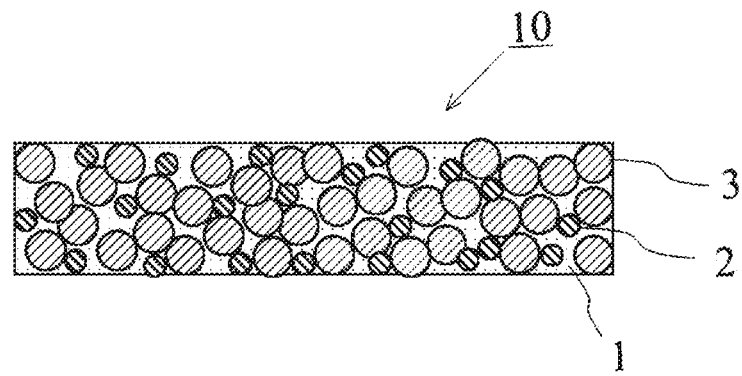
[FIG. 2]
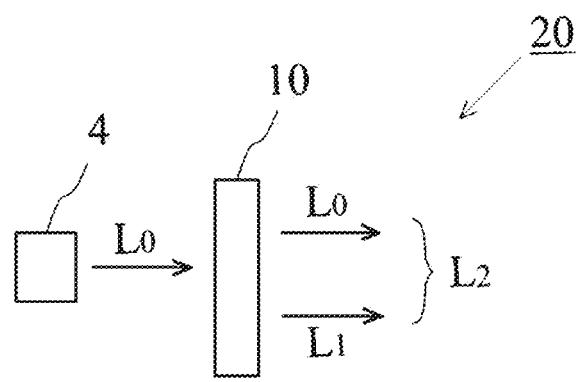
[FIG. 3]
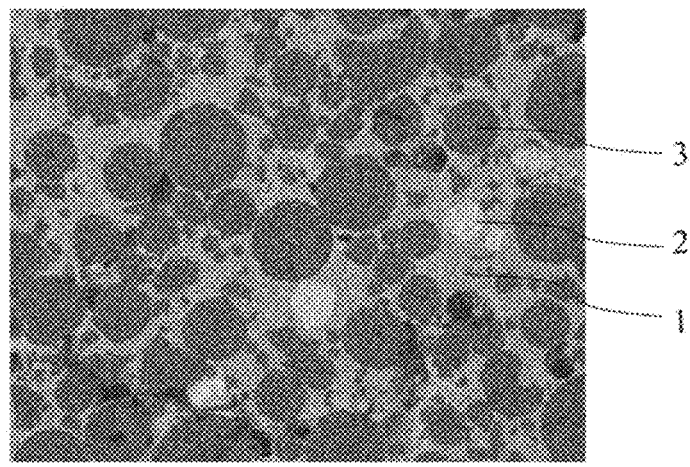

WAVELENGTH CONVERSION MEMBER AND METHOD FOR MANUFACTURING SAME, AND LIGHT-EMITTING DEVICE

TECHNICAL FIELD

The present invention relates to wavelength conversion members for converting the wavelength of light emitted from light emitting diodes (LEDs), laser diodes (LDs) or the like to another wavelength, manufacturing methods thereof, and light-emitting devices using the wavelength conversion members.

BACKGROUND ART

Recently, attention has been increasingly focused on light-emitting devices using excitation light sources, such as LEDs or LDs, as next-generation light-emitting devices to replace fluorescence lamps and incandescent lamps, from the viewpoint of their low power consumption, small size, light weight, and easy adjustment to light intensity. For example, Patent Literature 1 discloses, as an example of such a next-generation light-emitting device, a light-emitting device in which a wavelength conversion member is disposed on an LED capable of emitting a blue light and absorbs part of the light from the LED to convert it to a yellow light. This light-emitting device emits a white light which is a synthetic light of the blue light emitted from the LED and the yellow light emitted from the wavelength conversion member.

As a wavelength conversion member, there is conventionally used a wavelength conversion member in which a phosphor powder is dispersed in a resin matrix. However, when such a wavelength conversion member is used, there arises a problem that the resin is degraded by light from the excitation light source to make it likely that the luminance of the light-emitting device will be low. Particularly, the wavelength conversion member has a problem in that the molded resin is degraded by heat and high-energy short-wavelength (blue to ultraviolet) light emitted from the excitation light source to cause discoloration or deformation.

To cope with the above, a wavelength conversion member is proposed which is formed of a fully inorganic solid in which a phosphor powder is dispersed and set in, instead of the resin matrix, a glass matrix (see, for example, Patent Literatures 2 and 3). This wavelength conversion member has the feature that glass as the matrix is less likely to be degraded by heat and irradiation light from the LED and therefore less likely to cause problems of discoloration and deformation.

CITATION LIST

Patent Literature

[PTL 1] JP-A-2000-208815
[PTL 2] JP-A-2003-258308
[PTL 3] JP-B2-4895541

SUMMARY OF INVENTION

Technical Problem

Recently, the power of an LED or an LD for use as an excitation light source is increasing for the purpose of providing higher power. Along with this, the temperature of the wavelength conversion member rises due to heat from the excitation light source and heat emitted from the phosphor irradiated with excitation light, resulting in the problem that the luminescence intensity decreases with time (temperature quenching). Furthermore, in some cases, the temperature rise of the wavelength conversion member becomes significant, so that its component materials (such as the glass matrix) may melt.

In view of the foregoing, the present invention has an object of providing: a wavelength conversion member capable of reducing the decrease in luminescence intensity with time and the melting of component materials when irradiated with high-power excitation light; a method for manufacturing the same; and a light-emitting device using the wavelength conversion member.

Solution to Problem

A wavelength conversion member according to the present invention is a wavelength conversion member made of a phosphor powder and a thermally conductive filler both dispersed into an inorganic binder, a refractive index difference between the inorganic binder and the thermally conductive filler being 0.2 or less, a volume ratio of a content of the inorganic binder to a content of the thermally conductive filler being 40:60 to 5:95. When, as in the above structure, the content of the thermally conductive filler in the wavelength conversion member is large relative to the inorganic binder, heat of excitation light itself and heat generated from the phosphor powder when the wavelength conversion member is irradiated with the excitation light transmit through the thermally conductive filler and is efficiently released to the outside. Thus, the temperature rise of the wavelength conversion member can be reduced to reduce the decrease in luminescence intensity with time and the melting of the component materials. Furthermore, since the refractive index difference between the thermally conductive filler and the inorganic binder is small as described above, light scattering due to reflection at the interface between the thermally conductive filler and the inorganic binder can be reduced, so that the light extraction efficiency of excitation light or fluorescence emitted from the phosphor powder can be increased.

The wavelength conversion member according to the present invention preferably has a porosity of 10% or less. Thus, the proportion of air, which is less thermally conductive, existing in the inside of the wavelength conversion member becomes low, so that the thermal conductivity of the wavelength conversion member can be increased. In addition, light scattering caused by a refractive index difference between the inorganic binder, the thermally conductive filler or the phosphor powder and the air contained in the pores can be reduced, so that the light transparency of the wavelength conversion member can be increased.

In the wavelength conversion member according to the present invention, a distance between a plurality of adjacent particles of the thermally conductive filler and/or a distance from particles of the thermally conductive filler to particles of the phosphor powder adjacent to the particles of the thermally conductive filler is preferably 0.08 mm or less. Particularly, it is preferred that a plurality of particles of the thermally conductive filler be in contact with each other and/or particles of the thermally conductive filler be in contact with particles of the phosphor powder. Thus, the distance of heat conduction through the inorganic binder, which is less thermally conductive, becomes short and, in turn, heat conduction paths are formed between a plurality of particles of the thermally conductive filler, so that heat generated in the inside of the wavelength conversion member can be easily conducted to the outside.

In the wavelength conversion member according to the present invention, the thermally conductive filler preferably has an average particle diameter $D_{50}$ of 1 to 50 μm. Thus, the distance between the plurality of particles of the thermally conductive filler or the distance from the particles of the thermally conductive filler to the particles of the phosphor powder can be decreased, so that heat can be easily efficiently released to the outside.

In the wavelength conversion member according to the present invention, the thermally conductive filler preferably has a higher thermal conductivity than the phosphor powder.

In the wavelength conversion member according to the present invention, the thermally conductive filler that can be used is, for example, that made of an oxide ceramic. Specifically, the thermally conductive filler is preferably at least one selected from the group consisting of aluminum oxide, magnesium oxide, yttrium oxide, zinc oxide, and magnesia spinel.

In the wavelength conversion member according to the present invention, the inorganic binder preferably has a softening point of 1000° C. or lower.

In the wavelength conversion member according to the present invention, the inorganic binder is preferably glass.

The wavelength conversion member according to the present invention preferably has a thickness of 1000 μm or less.

The wavelength conversion member according to the present invention preferably has a thermal diffusivity of 1 $mm^2/s$ or more.

A method for manufacturing a wavelength conversion member according to the present invention is a method for manufacturing the above-described wavelength conversion member and includes the steps of: pouring a powder mixture of the inorganic binder, the phosphor powder, and the thermally conductive filler into a sintering mold; and hot-pressing the powder mixture. By doing so, the particles of the thermally conductive filler are likely to be in contact with each other or the particles of the thermally conductive filler are likely to be in contact with the particles of the phosphor powder. In addition, pores are less likely to remain in the inside of the wavelength conversion member, so that a dense wavelength conversion member can be obtained.

In the method for manufacturing the wavelength conversion member according to the present invention, the step of hot-pressing is preferably performed by a hot press, a spark plasma sintering machine or a hot isostatic press.

In the method for manufacturing the wavelength conversion member according to the present invention, a temperature during the hot-pressing is 1000° C. or lower. Thus, thermal degradation of the phosphor powder during the hot-pressing can be reduced.

A light-emitting device according to the present invention includes the above-described wavelength conversion member and a light source operable to irradiate the wavelength conversion member with excitation light.

In the light-emitting device according to the present invention, the light source is preferably a laser diode. Thus, the luminescence intensity can be increased. Note that when a laser diode is used as the light source, the temperature of the wavelength conversion member is likely to rise, which makes it likely that the effects of the present invention are exerted.

Advantageous Effects of Invention

The present invention enables provision of: a wavelength conversion member capable of reducing the decrease in luminescence intensity with time and the melting of component materials when irradiated with high-power excitation light; a method for manufacturing the same; and a light-emitting device using the wavelength conversion member.

BRIEF DESCRIPTION OF DRAWINGS

FIG. 1 is a schematic cross-sectional view showing a wavelength conversion member according to one embodiment of the present invention.

FIG. 2 is a schematic side view showing a light-emitting device in which the wavelength conversion member according to the one embodiment of the present invention is used.

FIG. 3 is a photograph of a partial cross section of a wavelength conversion member in Example No. 1.

DESCRIPTION OF EMBODIMENTS

Hereinafter, an embodiment of the present invention will be described in detail with reference to the drawings. However, the present invention is not at all limited to the following embodiment.

(Wavelength Conversion Member)

FIG. 1 is a schematic cross-sectional view showing a wavelength conversion member according to an embodiment of the present invention. The wavelength conversion member 10 is formed so that a phosphor powder 2 and a thermally conductive filler 3 are dispersed into an inorganic binder 1. The wavelength conversion member 10 according to this embodiment is a transmissive wavelength conversion member. When one of the principal surfaces of the wavelength conversion member 10 is irradiated with excitation light, part of the incident excitation light is converted in wavelength to fluorescence by the phosphor powder 2 and the fluorescence is radiated through the other principal surface to the outside. No particular limitation is placed on the shape of the wavelength conversion member 10, but the shape is generally a sheet-like shape having a rectangular or circular plan view.

As shown in FIG. 1, in this embodiment, a plurality of particles of the thermally conductive filler 3 are adjacent to or in contact with each other. Thus, the lengths of portions of the less thermally conductive inorganic binder 1 existing between the plurality of particles of the thermally conductive filler 3 are short. Particularly, heat conduction paths are formed at locations where some particles of the thermally conductive filler 3 are in contact with each other. Furthermore, since in this embodiment the particles of the thermally conductive filler 3 are adjacent to or in contact with the particles of the phosphor powder 2, the lengths of portions of the less thermally conductive inorganic binder 1 existing between the particles of the phosphor powder 2 and the particles of the thermally conductive filler 3 are short. Particularly, heat conduction paths are formed at locations where particles of the thermally conductive filler 3 are in contact with particles of the phosphor powder 2. The distance between the plurality of adjacent particles of the thermally conductive filler 3 and/or the distance from the particles of the thermally conductive filler 3 to the particles of the phosphor powder 2 adjacent to the particles of the thermally conductive filler 3 is preferably 0.08 mm or less and particularly preferably 0.05 mm or less. Thus, heat generated in the phosphor powder 2 is likely to be conducted to the outside, so that an undue increase in temperature of the wavelength conversion member 10 can be prevented.

The distance between the plurality of adjacent particles of the thermally conductive filler 3 and the distance from the particles of the thermally conductive filler 3 to the particles of the phosphor powder 2 adjacent to the particles of the thermally conductive filler 3 can be measured from a back-scattered electron image of a cross section of the wavelength conversion member 10.

Hereinafter, a detailed description will be given of the components.

The preferred inorganic binder 1 for use is that having a softening point of 1000° C. or lower in consideration of thermal degradation of the phosphor powder 2 in the firing step during production. An example of the inorganic binder 1 described above is glass. Glass has excellent thermal resistance as compared to organic matrices, such as resin, is easily fluidized by thermal treatment, and therefore has a feature of capability to easily densify the structure of the wavelength conversion member 10. The softening point of the glass is preferably 250 to 1000° C., more preferably 300 to 950° C., still more preferably within a range of 400 to 900° C., and particularly preferably within a range of 400 to 850° C. If the softening point of the glass is too low, the mechanical strength and chemical durability of the wavelength conversion member 10 may decrease. Furthermore, since the thermal resistance of the glass itself is low, the glass may be softened and deformed by heat generated from the phosphor powder 2. On the other hand, if the softening point of the glass is too high, the phosphor powder 2 may be degraded in the firing step during production, so that the luminescence intensity of the wavelength conversion member 10 may decrease. Note that, in terms of increasing the chemical stability and mechanical strength of the wavelength conversion member 10, the softening point of the glass is preferably not lower than 500° C., more preferably not lower than 600° C., still more preferably not lower than 700° C., yet still more preferably not lower than 800° C. and particularly preferably not lower than 850° C. Examples of the glass described above include borosilicate-based glasses, silicate-based glasses, and aluminosilicate-based glasses. However, as the softening point of the glass increases, the firing temperature increases, resulting in a tendency to raise the production cost. If, additionally, the thermal resistance of the phosphor powder 2 is low, the phosphor powder 2 may be degraded during firing. Therefore, in producing the wavelength conversion member 10 at low cost or in using a phosphor powder 2 having low thermal resistance, the softening point of the glass is preferably not higher than 550° C., more preferably not higher than 530° C., still more preferably not higher than 500° C., yet still more preferably not higher than 480° C., and particularly preferably not higher than 460° C. Examples of the glass described above include tin-phosphate-based glasses, bismuthate-based glasses, and tellurite-based glasses.

The glass for use as the inorganic binder 1 is generally a glass powder. The average particle diameter of the glass powder is preferably 50 μm or less, more preferably 30 pin or less, still more preferably 10 pin or less, and particularly preferably 5 pin or less. If the average particle diameter of the glass powder is too large, a dense sintered body is less likely to be obtained. No particular limitation is placed on the lower limit of the average particle diameter of the glass powder, but it is generally 0.5 μm or more and preferably 1 μm or more.

Note that the average particle diameter used herein refers to a value measured by laser diffractometry and indicates the particle diameter ($D_{50}$) when in a volume-based cumulative particle size distribution curve as determined by laser diffractometry the integrated value of cumulative volume from the smaller particle diameter is 50%.

No particular limitation is placed on the type of the phosphor powder 2 so long as it emits fluorescence upon entry of excitation light. Specific examples of the phosphor powder 2 include at least one selected from the group consisting of, for example, oxide phosphor, nitride phosphor, oxynitride phosphor, chloride phosphor, oxychloride phosphor, sulfide phosphor, oxysulfide phosphor, halide phosphor, chalcogenide phosphor, aluminate phosphor, halophosphoric acid chloride phosphor, and garnet-based compound phosphor. With the use of a blue light as the excitation light, a phosphor capable of emitting as the fluorescence, for example, a green light, a yellow light or a red light can be used.

The average particle diameter of the phosphor powder 2 is preferably 1 to 50 μm and particularly preferably 5 to 30 μm. If the average particle diameter of the phosphor powder 2 is too small, the luminescence intensity is likely to decrease. On the other hand, if the average particle diameter of the phosphor powder 2 is too large, the luminescent color tends to be uneven.

The content of the phosphor powder 2 in the wavelength conversion member 10 is preferably 1 to 70% by volume, more preferably 1 to 50% by volume, and particularly preferably 1 to 30% by volume. If the content of the phosphor powder 2 is too small, a desired luminescence intensity is less likely to be obtained. On the other hand, if the content of the phosphor powder 2 is too large, the thermal diffusivity of the wavelength conversion member 10 decreases, so that the heat dissipation properties are likely to decrease.

The thermally conductive filler 3 has a higher thermal conductivity than the inorganic binder 1. Particularly, the thermally conductive filler 3 preferably has a higher thermal conductivity than the inorganic binder 1 and the phosphor powder 2. Specifically, the thermal conductivity of the thermally conductive filler 3 is preferably 5 W/m·K or more, more preferably 20 W/m·K or more, still more preferably 40 W/m·K or more, and particularly preferably 50 W/m·K or more.

The preferred thermally conductive filler 3 is an oxide ceramic. Specific examples of the oxide ceramic include aluminum oxide, magnesium oxide, yttrium oxide, zinc oxide, and magnesia spinel ($MgAl_2O_4$). These oxide ceramics may be used singly or in a mixture of two or more of them. Among them, aluminum oxide or magnesium oxide, which have relatively high thermal conductivities, is preferably used and, particularly, magnesium oxide, which has a high thermal conductivity and less light absorption, is more preferably used. Magnesia spinel is preferred in terms of relatively high availability and relative inexpensiveness.

The average particle diameter of the thermally conductive filler 3 is preferably 1 μm or more, more preferably 5 μm or more, still more preferably 10 μm or more, and particularly preferably 20 μm or more. If the average particle diameter of the thermally conductive filler 3 is too small, the particles of the thermally conductive filler 3 are less likely to lie adjacent to each other or heat conduction paths due to contact between the particles of the thermally conductive filler 3 are less likely to be formed, so that a sufficient heat dissipation effect is less likely to be achieved. On the other hand, if the average particle diameter of the thermally conductive filler 3 is too large, spaces formed between the plurality of particles of the thermally conductive filler 3 become large, so that the density of the wavelength conversion member 10 is likely to decrease. Therefore, the average particle diameter of the thermally conductive filler 3 is preferably 50 µm or less, more preferably 40 µm or less, and particularly preferably 30 µm or less.

The volume ratio of the content of the inorganic binder 1 to the content of the thermally conductive filler 3 in the wavelength conversion member 10 is 40:60 to 5:95, preferably 38:62 to 10:90, more preferably 37:63 to 15:85, and still more preferably 35:65 to 20:80. If the content of the thermally conductive filler 3 is too small (i.e., the content of the inorganic binder 1 is too large), a desired heat dissipation effect is less likely to be achieved. On the other hand, if the content of the thermally conductive filler 3 is too large (i.e., the content of the inorganic binder 1 is too small), the number of pores in the wavelength conversion member 10 increases. Therefore, a desired heat dissipation effect cannot be achieved, and light scattering in the inside of the wavelength conversion member 10 becomes excessive, so that the fluorescence intensity is likely to decrease.

The respective contents of the inorganic binder 1 and the thermally conductive filler 3 in the wavelength conversion member 10 are basically determined according to the content of the phosphor powder 2. Specifically, the total amount of the inorganic binder 1 and the thermally conductive filler 3 in the wavelength conversion member 10 is adjusted, in consideration of the content of the phosphor powder 2, preferably within a range of 30 to 99% by volume, more preferably within a range of 50 to 99% by volume, and particularly preferably within a range of 70 to 99% by volume.

The porosity (% by volume) in the wavelength conversion member 10 is preferably 10% or less, more preferably 5% or less, and particularly preferably 3% or less. If the porosity is too high, the heat dissipation effect is likely to decrease. In addition, light scattering in the inside of the wavelength conversion member 10 becomes excessive, so that the fluorescence intensity is likely to decrease.

The refractive index difference (nd) between the inorganic binder 1 and the thermally conductive filler 3 is 0.2 or less, preferably 0.15 or less, and particularly preferably 0.1 or less. If the refractive index difference is too large, reflection at the interface between the inorganic binder 1 and the thermally conductive filler 3 increases, so that light scattering becomes excessive and, thus, the fluorescence intensity is likely to decrease.

The thickness of the wavelength conversion member 10 is preferably 1000 µm or less, more preferably 500 µm or less, and still more preferably 300 µm or less. If the wavelength conversion member 10 is too thick, scattering and absorption of light in the wavelength conversion member 10 become too much, so that the efficiency of emission of fluorescence tends to decrease. In addition, the temperature of the wavelength conversion member 10 becomes high, so that a decrease in luminescence intensity with time and melting of the component materials are likely to occur. The lower limit of the thickness of the wavelength conversion member 10 is preferably about 30 µm. If the wavelength conversion member 10 is too thin, its mechanical strength is likely to decrease, and excitation light is less likely to be absorbed in the phosphor powder 2, so that the luminescence intensity is likely to decrease.

An antireflection film, a bandpass filter or a microstructure, such as a moth eye structure, may be provided on an incident surface of the wavelength conversion member 10 through which excitation light enters the wavelength conversion member 10, for the purposes of reducing the reflection loss of the excitation light and reducing the leakage of fluorescence to the incident side.

When the wavelength conversion member 10 has the above structure, it has excellent thermal diffusion properties. Specifically, the thermal diffusivity of the wavelength conversion member 10 is preferably 1 mm$^2$/s or more, more preferably 2 mm$^2$/s or more, still more preferably 3 mm$^2$/s or more, and particularly preferably 4 mm$^2$/s or more.

The wavelength conversion member 10 may be used by joining it to a different heat dissipating member made of metal, ceramic or so on. By doing so, heat generated in the wavelength conversion member 10 can be more efficiently released from the outside.

(Method for Manufacturing Wavelength Conversion Member)

The wavelength conversion member 10 can be produced by the step of pouring a powder mixture of the inorganic binder 1, the phosphor powder 2, and the thermally conductive filler 3 into a sintering mold and the step of hot-pressing the powder mixture.

The hot pressing can be performed, for example, by a hot press, a spark plasma sintering machine or a hot isostatic press. With the use of these machines, a dense sintered body can be easily obtained.

The temperature during the hot pressing is preferably 1000° C. or lower, more preferably 950° C. or lower, and particularly preferably 900° C. or lower. If the temperature during the hot pressing is too high, the phosphor powder 2 is likely to thermally degrade. On the other hand, if the temperature during the hot pressing is too low, a dense sintered body is less likely to be obtained. Therefore, the temperature is preferably not lower than 250° C., more preferably not lower than 300° C., and particularly preferably not lower than 400° C.

The pressure during the hot pressing is appropriately adjusted, in order to provide a dense sintered body, for example, preferably within a range of 10 to 100 MPa and particularly preferably within a range of 20 to 60 MPa.

The atmosphere during the firing is preferably an atmosphere of a reduced pressure, such as vacuum. Thus, defoaming during the firing can be promoted, so that a dense sintered body is likely to be obtained.

There is no particular limitation as to the material for the sintering mold and, for example, a carbon-made mold can be used.

(Light-Emitting Device)

FIG. 2 is a schematic side view showing a light-emitting device in which the wavelength conversion member according to the above-described embodiment is used. As shown in FIG. 2, the light-emitting device 20 includes the wavelength conversion member 10 and a light source 4. Excitation light $L_0$ emitted from the light source 4 is converted to fluorescence $L_1$ by the wavelength conversion member 10. Furthermore, part of the excitation light $L_0$ passes through the wavelength conversion member 10 as it is. Therefore, the wavelength conversion member 10 emits synthetic light L2 composed of the excitation light $L_0$ and the fluorescence $L_1$. For example, when the excitation light $L_0$ is a blue light and the fluorescence $L_1$ is a yellow light, a white synthetic light L2 can be provided.

Since the above-described wavelength conversion member 10 is used in the light-emitting device 20, heat generated by irradiating the wavelength conversion member 10 with excitation light can be efficiently released to the outside. Thus, an undue rise in temperature of the wavelength conversion member 10 can be prevented.

Examples of the light source 4 include an LED and an LD. In terms of increasing the luminescence intensity of the light-emitting device 20, an LD, which is capable of emitting high-intensity light, is preferably used as the light source 4. When an LD is used as the light source, the temperature of the wavelength conversion member 10 is likely to rise, which makes it likely that the effects of the present invention are exerted.

Examples

Hereinafter, the wavelength conversion member according to the present invention will be described in detail with reference to examples, but the present invention is not limited to the following examples.

Table 1 shows working examples (Nos. 1 to 10) of the present invention and comparative examples (Nos. 11 to 13).

Inorganic binder C (tin-phosphate-based glass, softening point: 380° C., refractive index (nd): 1.82, average particle diameter $D_{50}$: 3.8 μm)

Inorganic binder D (bismuth-based glass, softening point: 450° C., refractive index (nd): 1.91, average particle diameter $D_{50}$: 2.7 μm)

Inorganic binder E (borosilicate-based glass, softening point: 775° C., refractive index (nd): 1.49, average particle diameter $D_{50}$: 1.3 μm)

(c) Phosphor Powder

YAG phosphor ($Y_3Al_5O_{12}$, average particle diameter: 15 μm)

CASN phosphor ($CaAlSiN_3$, average particle diameter: 18 μm)

TABLE 1

| | | No. 1 | No. 2 | No. 3 | No. 4 | No. 5 | No. 6 | No. 7 | No. 8 | No. 9 | No. 10 | No. 11 | No. 12 | No. 13 |
|---|---|---|---|---|---|---|---|---|---|---|---|---|---|---|
| Thermally conductive filler | Type | MgO | MgO | MgO | MgO | MgO | $Al_2O_3$ | $Al_2O_3$ | MgO | MgO | $MgAl_2O_4$ | MgO | MgO | MgO |
| | Refractive index nd1 | 1.73 | 1.73 | 1.73 | 1.73 | 1.73 | 1.76 | 1.76 | 1.73 | 1.73 | 1.72 | 1.73 | 1.73 | 1.73 |
| | Average particle diameter | 43 | 43 | 8 | 8 | 8 | 9 | 9 | 43 | 43 | 20 | 43 | 43 | 43 |
| | Content (% by volume) | 70 | 70 | 70 | 70 | 70 | 70 | 70 | 70 | 70 | 70 | 70 | 30 | 98 |
| Inorganic binder | Type | A | B | A | B | A | A | B | C | D | A | E | A | A |
| | Softening point | 790 | 850 | 790 | 850 | 790 | 790 | 850 | 380 | 450 | 790 | 775 | 790 | 790 |
| | Refractive index nd2 | 1.71 | 1.56 | 1.71 | 1.56 | 1.71 | 1.71 | 1.56 | 1.82 | 1.91 | 1.71 | 1.49 | 1.71 | 1.71 |
| | Refractive index difference \|nd1−nd2\| | 0.02 | 0.17 | 0.02 | 0.17 | 0.02 | 0.05 | 0.2 | 0.09 | 0.18 | 0.01 | 0.24 | 0.02 | 0.02 |
| Thermal treatment temperature (° C.) | | 820 | 900 | 820 | 900 | 820 | 820 | 900 | 450 | 500 | 820 | 830 | 820 | 820 |
| Thermally conductive filler to inorganic binder (volume ratio) | | 70:30 | 70:30 | 70:30 | 70:30 | 80:20 | 70:30 | 70:30 | 70:30 | 70:30 | 70:30 | 70:30 | 30:70 | 98:2 |
| Phosphor powder | Type | YAG | YAG | YAG | YAG | YAG | YAG | YAG | CASN | CASN | YAG | YAG | YAG | YAG |
| | Content (% by volume) | 3 | 3 | 3 | 3 | 3 | 3 | 3 | 3 | 3 | 3 | 3 | 3 | 3 |
| Porosity (%) | | 2.3 | 3.5 | 6.3 | 6.5 | 7.2 | 3.2 | 2.2 | 4.8 | 4.3 | 3.3 | 3.7 | 0.6 | 12.2 |
| Thermal diffusivity ($mm^2/s$) | | 4.15 | 4.21 | 4.06 | 3.99 | 4.12 | 2.98 | 3.1 | 3.64 | 3.45 | 2.32 | 4.11 | 0.44 | 3.01 |
| Excitation light transmittance | | 0.46 | 0.47 | 0.38 | 0.28 | 0.21 | 0.39 | 0.37 | 0.32 | 0.25 | 0.48 | 0.08 | 0.48 | 0.04 |
| Thermal resistance | | Good | Good | Good | Good | Good | Good | Good | Good | Good | Good | Good | Poor | Good |

A thermally conductive filler, an inorganic binder, and a phosphor powder were mixed to give each ratio described in Table 1, thus obtaining a powder mixture. Note that in the table the content of the phosphor powder is a content in the powder mixture and the remainder is accounted for by the thermally conductive filler and the inorganic binder. The materials used were as follows.

(a) Thermally Conductive Filler

MgO (thermal conductivity: approximately 42 W/m·K, average particle diameter $D_{50}$: 43 μm or 8 μm)

$Al_2O_3$ (thermal conductivity: approximately 20 W/m·K, average particle diameter $D_{50}$: 9 μm)

$MgAl_2O_4$ (thermal conductivity: approximately 16 W/m·K, average particle diameter $D_{50}$: 20 μm)

(b) Inorganic Binder

Inorganic binder A (barium silicate-based glass powder, softening point: 790° C., refractive index (nd): 1.71, average particle diameter $D_{50}$: 2.5 μm)

Inorganic binder B (borosilicate-based glass, softening point: 850° C., refractive index (nd): 1.56, average particle diameter $D_{50}$: 1.4 μm)

The obtained powder mixture was loaded into a 40 mm-diameter carbon-made mold placed in a hotpress furnace (Hi-multi 5000) manufactured by Fuji Dempa Kogyo Co., Ltd., and subjected to hot pressing. As the conditions of the hot pressing, the powder mixture was raised in temperature to the thermal treatment temperature shown in Table 1 under a vacuum atmosphere, pressed at a pressure of 40 MPa for 20 minutes, and then slowly cooled to ordinary temperature with introduction of $N_2$ gas. The obtained sintered body was cut to obtain a 5 mm×5 mm×1 mm sheet of wavelength conversion member.

The obtained wavelength conversion members were evaluated in terms of porosity, thermal diffusivity, excitation light transmittance, and thermal resistance in the following manners. The results are shown in Table 1. Furthermore, a photograph of a partial cross section of the wavelength conversion member in No. 1 is shown in FIG. 3.

The porosity was obtained by binarizing a photograph of a backscattered electron image of a cross section of each wavelength conversion member using an image analysis software Winroof and calculating the porosity from the proportion of area of pores occupying in the obtained processed image.

The thermal diffusivity was measured with a thermal diffusivity measurement system i-phase manufactured by ai-Phase Co., Ltd.

The excitation light transmittance was measured in the following manner. Two 30 mm×30 mm×2 mm aluminum sheets with a 3 mm-diameter opening formed in the center were prepared. The wavelength conversion member was sandwiched and secured between the two aluminum sheets. The wavelength conversion member was secured to be located substantially in the center of the aluminum plates and exposed from the openings of both the aluminum sheets. The exposed wavelength conversion member was irradiated, through the opening of one of the aluminum sheets, with excitation light (with a wavelength of 445 nm and a power of 3 W) from an LD. Light emitted through the opening of the other aluminum sheet was taken into an integrating sphere, guided to a spectrometer calibrated by a reference light source, and measured in terms of spectral energy distribution with the spectrometer. The peak height of the excitation light wavelength in the obtained spectrum was indicated by P1. Separately, the excitation light of the LD was directly taken into an integrating sphere and measured in terms of spectral energy distribution in the same manner, and the peak height of the excitation light wavelength in the spectrum was indicated by P0. In this case, the value of P1/P0 was defined as the "excitation light transmittance".

The thermal resistance of the wavelength conversion members was evaluated in the following manner. In the above-described measurement test for the excitation light transmittance, each wavelength conversion member was irradiated with the LD for 60 seconds and the state of the glass matrix of the wavelength conversion member was observed. Cases where no difference was found in the glass matrix were evaluated to be good as indicated by a "Good" sign, whereas a case where the glass matrix was melted was evaluated to be no good as indicated by a "Poor" sign.

As is obvious from Table 1, the wavelength conversion members Nos. 1 to 10, which were working examples, exhibited high thermal diffusivities of 2.32 mm²/s or more and had good thermal resistance. In contrast, the wavelength conversion member No. 11, which was a comparative example, had a high refractive index difference of 0.24 between the thermally conductive filler and the inorganic binder, therefore caused excessively large light scattering at the interface between them, and exhibited a low excitation light transmittance of 0.08. The wavelength conversion member No. 12 had an excessively small proportion of thermally conductive filler, therefore exhibited a low thermal diffusivity of 0.44 mm²/s and had poor thermal resistance. The wavelength conversion member No. 13 had an excessively large proportion of thermally conductive filler and therefore exhibited a large porosity. Thus, it caused large light scattering and exhibited a low excitation light transmittance of 0.04. From the above, it can be seen that the wavelength conversion members Nos. 1 to 10 can efficiently release heat generated in the inside to the outside and have excellent light extraction efficiencies and excellent thermal resistance.

INDUSTRIAL APPLICABILITY

The wavelength conversion member according to the present invention is suitable as a component of a general lighting, such as a white LED, or a special lighting (for example, a light source for a projector, a light source for a vehicle headlight or a light source for an endoscope).

REFERENCE SIGNS LIST 1 inorganic binder
2 phosphor powder
3 thermally conductive filler
4 light source
10 wavelength conversion member
20 light-emitting device

The invention claimed is:

1. A wavelength conversion member made of a phosphor powder and a thermally conductive filler both dispersed in an inorganic binder,
   a refractive index difference between the inorganic binder and the thermally conductive filler being 0.2 or less,
   a volume ratio of a content of the inorganic binder to a content of the thermally conductive filler being 40:60 to 5:95.

2. The wavelength conversion member according to claim 1, having a porosity of 10% or less.

3. The wavelength conversion member according to claim 1, wherein a distance between a plurality of adjacent particles of the thermally conductive filler and/or a distance from particles of the thermally conductive filler to particles of the phosphor powder adjacent to the particles of the thermally conductive filler is 0.08 mm or less.

4. The wavelength conversion member according to claim 1, wherein a plurality of particles of the thermally conductive filler are in contact with each other and/or particles of the thermally conductive filler are in contact with particles of the phosphor powder.

5. The wavelength conversion member according to claim 1, wherein the thermally conductive filler has an average particle diameter $D_{50}$ of 1 to 50 µm.

6. The wavelength conversion member according to claim 1, wherein the thermally conductive filler has a higher thermal conductivity than the phosphor powder.

7. The wavelength conversion member according to claim 1, wherein the thermally conductive filler is made of an oxide ceramic.

8. The wavelength conversion member according to claim 7, wherein the thermally conductive filler is at least one selected from the group consisting of aluminum oxide, magnesium oxide, yttrium oxide, zinc oxide, and magnesia spinel.

9. The wavelength conversion member according to claim 1, wherein the inorganic binder has a softening point of 1000° C. or lower.

10. The wavelength conversion member according to claim 1, wherein the inorganic binder is glass.

11. The wavelength conversion member according to claim 1, having a thickness of 1000 µm or less.

12. The wavelength conversion member according to claim 1, having a thermal diffusivity of 1 mm²/s or more.

13. A method for manufacturing the wavelength conversion member according to claim 1, the method comprising the steps of:
   pouring a powder mixture of the inorganic binder, the phosphor powder, and the thermally conductive filler into a sintering mold; and
   hot-pressing the powder mixture.

14. The method for manufacturing the wavelength conversion member according to claim 13, wherein the step of hot-pressing is performed by a hot press, a spark plasma sintering machine or a hot isostatic press.

15. The method for manufacturing the wavelength conversion member according to claim 13, wherein a temperature during the hot-pressing is 1000° C. or lower.

16. A light-emitting device comprising: the wavelength conversion member according to claim 1; and a light source operable to irradiate the wavelength conversion member with excitation light.

17. The light-emitting device according to claim 16, wherein the light source is a laser diode.

* * * * *